United States Patent
Sakaguchi et al.

(10) Patent No.: US 6,813,684 B2
(45) Date of Patent: Nov. 2, 2004

(54) DISK DRIVE SYSTEM AND METHOD FOR CONTROLLING A CACHE MEMORY

(75) Inventors: Akihiko Sakaguchi, Kokubunji (JP); Shinji Fujiwara, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 291 days.

(21) Appl. No.: 10/222,828

(22) Filed: Aug. 19, 2002

(65) Prior Publication Data

US 2003/0212855 A1 Nov. 13, 2003

(30) Foreign Application Priority Data

May 10, 2002 (JP) ........................................ 2002-134840

(51) Int. Cl.[7] .............................................. G06F 12/00
(52) U.S. Cl. ........................ 711/113; 711/129; 711/133; 711/134; 711/136; 711/154; 711/159; 711/160; 711/170; 711/171; 711/172; 711/173; 711/203; 711/205; 711/206; 711/207; 711/208; 711/209
(58) Field of Search ................................. 711/113, 129, 711/133, 134, 136, 154, 159, 160, 170–173, 203, 205–209

(56) References Cited

U.S. PATENT DOCUMENTS 5,537,635 A * 7/1996 Douglas ..................... 711/129
5,835,964 A * 11/1998 Draves et al. .............. 711/207
6,047,354 A * 4/2000 Yoshioka et al. ........... 711/118

FOREIGN PATENT DOCUMENTS

JP 11-65927 8/1997
JP 2002-7213 6/2000

* cited by examiner

*Primary Examiner*—Donald Sparks
*Assistant Examiner*—Bao Q Truong
(74) *Attorney, Agent, or Firm*—Reed Smith LLP; Stanley P. Fisher, Esq.; Juan Carlos A. Marquez, Esq.

(57) ABSTRACT

Disclosed is a disk system for controlling divided areas of a cache memory. Identification information that denotes whether data to be accessed is user data or meta data is added to each I/O command issued from a CPU. A disk controller, when receiving such an I/O command, selects a target virtual area from among a plurality of virtual areas set in the cache memory according to the identification information. When new data is to be stored in the cache memory upon the execution of the I/O command, the disk controller records the number of the selected virtual area in the cache memory in correspondence with the new data. A cache data replacement is executed independently for each cache area, thereby a predetermined upper limit size of each cache memory area can be kept.

14 Claims, 5 Drawing Sheets

CACHE SEGMENT

FIG. 3

AREA INFORMATION TABLE

| AREA NUMBER | MAXIMUM SIZE | USED SIZE |
|---|---|---|
| 00 | 200 | 150 |
| 01 | 120 | 100 |
| 10 | 80 | 80 |
| 11 | 100 | 90 |

SETTING SCREEN FOR THE NUMBER OF DIVISIONS

INPUT THE NUMBER OF AREAS : ~501

SETTING SCREEN FOR THE SIZE OF AREA #1 ↓

INPUT THE SIZE OF AREA #1 : ~502

SETTING SCREEN FOR THE SIZE OF AREA #n ⋮

INPUT THE SIZE OF AREA #n : ~503

DISK DRIVE SYSTEM AND METHOD FOR CONTROLLING A CACHE MEMORY

BACKGROUND OF THE INVENTION

The present invention relates to a method for controlling accesses to such storage sources as a disk, etc. More particularly, the present invention relates to a method for controlling a disk cache memory.

When compared with the arithmetic operation of a CPU, it takes much time to access a disk. This is why a cache memory is used to store data that has been accessed once so that the data, when it is accessed next time, is read from the cache memory to shorten the access time. However, the capacity of the cache memory is smaller than that of the disk. Consequently, the cache memory is often required to discard older data to store new data.

One of the well-known general cache memory controlling methods is the least recently used (LRU) algorithm. According to the LRU algorithm, the least recently accessed data is purged from the subject cache memory when some data therein should be replaced with new data. The last access time is added to each data stored in the cache memory. When data stored in the cache memory is accessed, the access information of the data is updated so that the data is kept updated to the latest. It is due to this access information that older data can be discarded sequentially from the cache memory. The official gazette of JP-A No.65927/1999 discloses a system provided with a "priority cache memory" that caches files with priority levels in addition to the ordinary LRU-controlled cache memory. This priority cache memory employs a controlling method that determines each file to be discarded according to its priority level.

The LRU algorithm sometimes swaps out earlier accessed data from the cache memory while the data is used frequently. This is because the algorithm regards even the data that is used only once as the latest accessed data.

According to the above described conventional technique that uses such a priority cache memory together with an ordinary LRU-controlled cache memory, a priority attribute is added beforehand to each file that seems to be accessed frequently, so that the file is stored in the priority cache memory. Consequently, the above problem is solved and the cache hit percentage increases. On the other hand, the LRU-controlled cache memory can also be used for files that are not accessed so often, but accessed very frequently at a time. In order to avoid this problem, however, the above described conventional technique distinguishes files to be stored in the priority cache memory from others and the users are requested to determine and set priority levels of those files by themselves. In addition, the priority cache memory is separated physically from the LRU-controlled cache memory and the capacity of each of those cache memories cannot be set freely. This is the problem of the conventional technique.

Under such circumstances, it is an object of the present invention to provide a cache memory system and a method for controlling the cache system, which uses a cache memory divided into a plurality of areas and enables data to be stored in each of those areas automatically according to its state, thereby preventing data to be accessed frequently from being swapped out by data not to be accessed so often and improving the cache hit percentage and the I/O performance.

It is another object of the present invention to provide a cache system and a method for controlling the cache system that enables the capacity of each of the divided cache memory areas to be set freely, thereby making it easier to set the area according to the state of the data to be stored therein.

SUMMARY OF THE INVENTION

The typical feature of the present invention disclosed in this specification is cache replacement performed independently for each area in the subject cache memory by dividing the cache memory into a plurality of areas having area numbers to be recorded in their corresponding segments when data is stored therein and setting an upper limit size for each of those areas. This means that a plurality of preset areas are just virtual areas for which their sizes are set.

More concretely, identification information is added to each disk data I/O command issued from the CPU. The identification information denotes a type of each data to be accessed. The identification information is used as the area number of each target area when data is written/read by the I/O command in/from the cache memory. The identification information is recorded in the cache memory actually as the number of an area in/from which data is written/read.

Still more concretely, the type of data to be accessed by an I/O command denotes at least user data or meta data. The meta data can also be divided into meta data of i-node, directories, and others. User data is specified by respective application programs while the meta data is used by a file system to manage files. Consequently, when the CPU in which the file system runs issues an I/O command, the system can determine which type data is to be accessed automatically. This is why the identification information for a data type can be added to each I/O command. The user is not requested of anything for this information addition.

User data is generally accessed at random. Meta data is accessed more often than user data. According to the cache memory controlling method described above, the data type added to each I/O command denotes a cache memory area to be accessed and the upper limit size of each area is controlled so that data in any area is replaced with new data independently. This is why it is prevented that meta data is swapped out from the cache memory to store new user data, thereby the cache hit percentage increases.

Other features of the present invention will become more apparent in the description of the preferred embodiments.

DETAILED DESCRIPTION OF THE PREFERRED EMBODIMENTS

Hereunder, the first embodiment of the present invention will be described with reference to the accompanying drawings.

Figure 1:
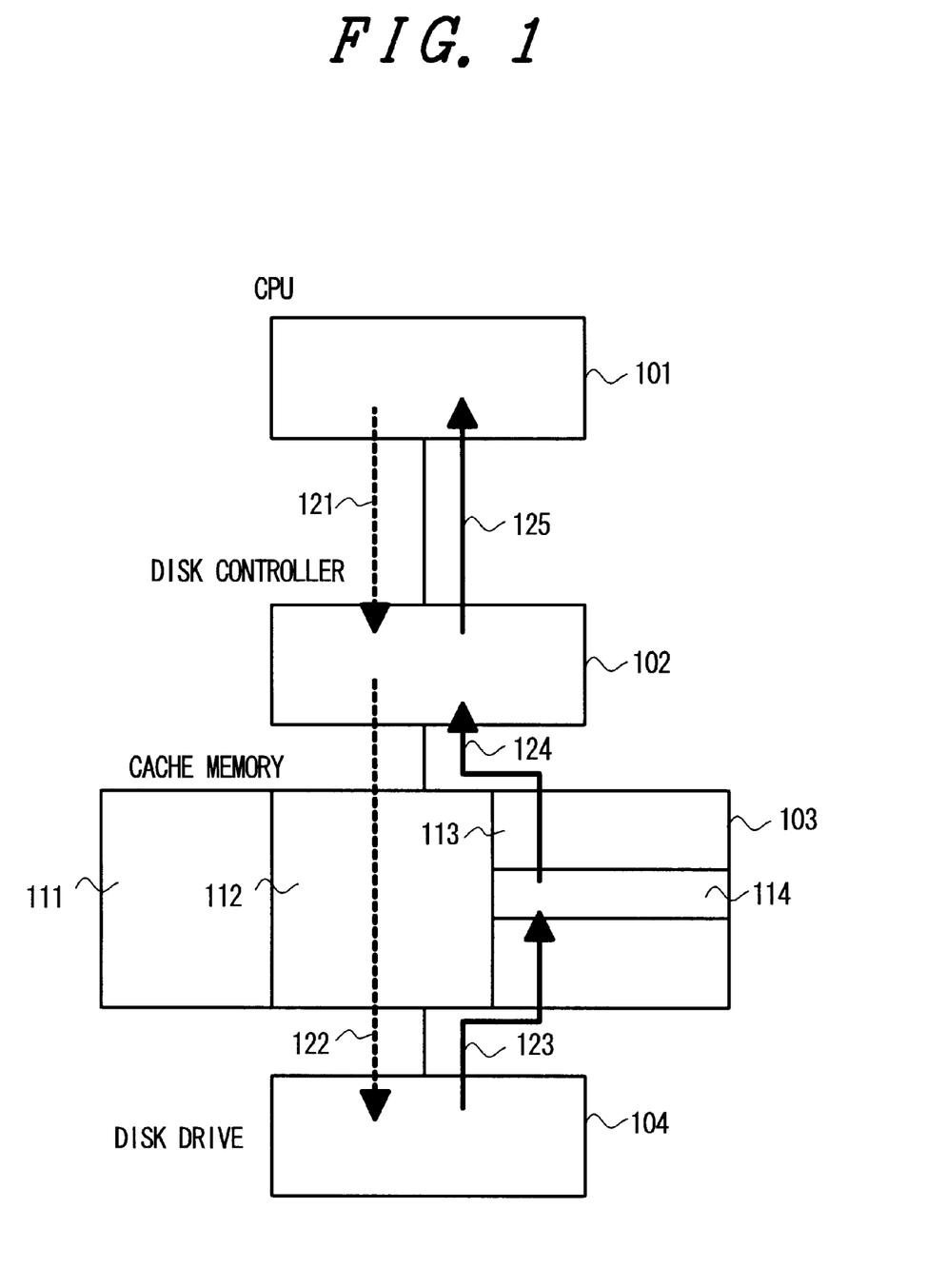
FIG. 1 is a schematic block diagram of an embodiment of the present invention.

FIG. 1 is a block diagram for describing the concept of this first embodiment. Reference numerals 101, 102, 103, and 104 denote a CPU, a disk controller, a cache memory, and a disk drive respectively. The cache memory 103 includes a plurality of virtual areas 111 to 113. A dotted line arrow denotes a command flow and a solid line arrow denotes a data flow. The CPU 101, when issuing a READ command, adds identification information to the read command according to the target I/O type, then issues an I/O request (step 121) to the disk controller 102. Receiving the I/O request, the disk controller 102 selects one of the plurality of areas 111 to 113 in the cache memory according to the identification information. The disk controller 102 then checks the cache memory 103 for the presence of the required data. When the check result is NO, the disk controller 102 accesses the disk (step 122) to read the required data therefrom. The read data is stored in an empty segment 114 provided in the selected area (that is assumed as the area 113 here). After that, the read data is passed to the disk controller 102 (step 124). The I/O command processing completes when the CPU 101 receives the data (step 125).

Figure 2:
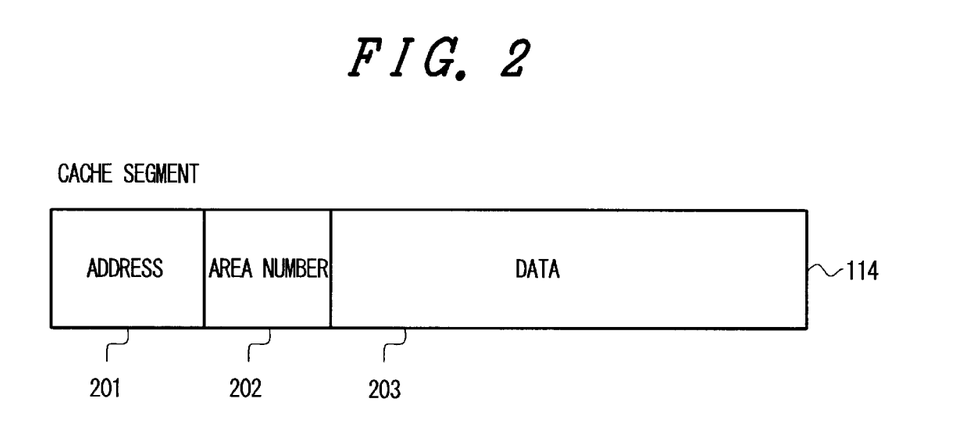
FIG. 2 is a configuration of data in each segment of a cache memory in the embodiment of the present invention.

The space in the cache memory 103 is managed in segments. Data is cached in each of the segments. As shown in FIG. 2, each segment is configured by an address 201 of stored data in the disk drive, an area number 202 denoting which of the plurality of areas is used in the cache memory 103, and a real stored data body 203.

The cache memory areas mentioned above are not physically segmented areas. They are just areas, each having a preset upper limit size, that is, the number of usable segments therein. An area number 202 is recorded in correspondence with each data body 203 stored in such a cache memory area according to an I/O command from the CPU 101 and the data stored area is determined when the data body 203 and the area number 202 are validated. This is why the partition of the cache memory 103 in FIG. 1 is just a virtual one. In addition, segments in an area are not always disposed consecutively.

In this embodiment, four types areas are defined in the cache memory 103. The four types of areas are a user data area, a meta data (i-node) area, another meta data (directory information) area, and still another meta data (other) area. Area numbers, 00, 01, 10, and 11 are assigned to those areas, which are set in the area number 202 field. User data means a user specified file. Meta data means data used by the file system to control I/O processings. Each I/O command issued by the CPU 101 includes identification information for distinguishing one of the above described four types of data from others in I/O controlling. The identification information included in each I/O command is recorded as an area number as is when data is stored/read in/from a segment of the cache memory 103 according to an I/O command.

Figure 3:
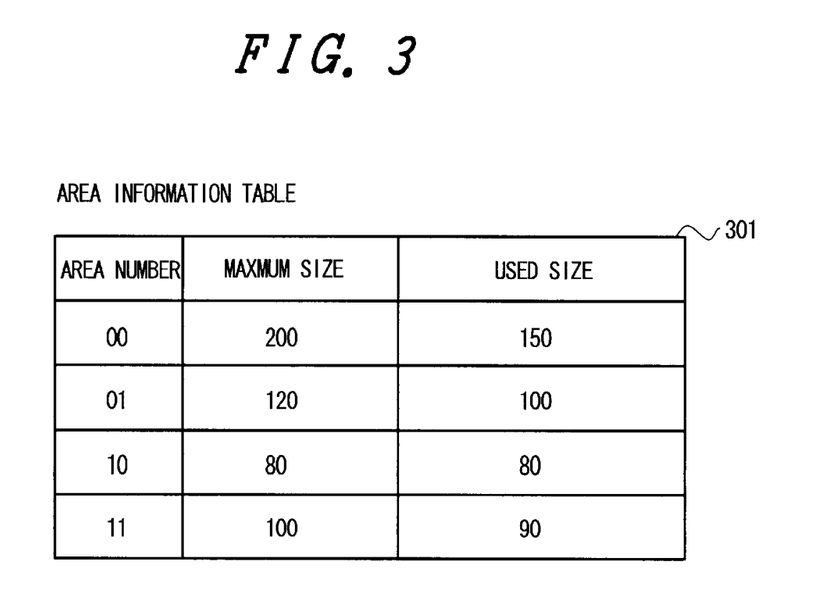
FIG. 3 is a configuration of the data in an area information table provided in a disk controller in the embodiment of the present invention.

The disk controller 102 has an area information table 301 shown in FIG. 3 therein. The area information table 301 stores both upper limit size and used size of each area in the cache memory 103. The disk controller 102, when receiving an I/O command, refers to this area information table 301 according to the identification information included in the I/O command and checks the specified cache area for presence of any empty space. When the check result is NO (not present), the disk controller 102 selects the data in the cache area, that is, the data in the currently used segment having the same area number as that of the data to be replaced, then replaces the data with new data read from the disk controller 104. When the check result is YES (present), the disk controller 102 stores the new data in the segment.

Figure 4:
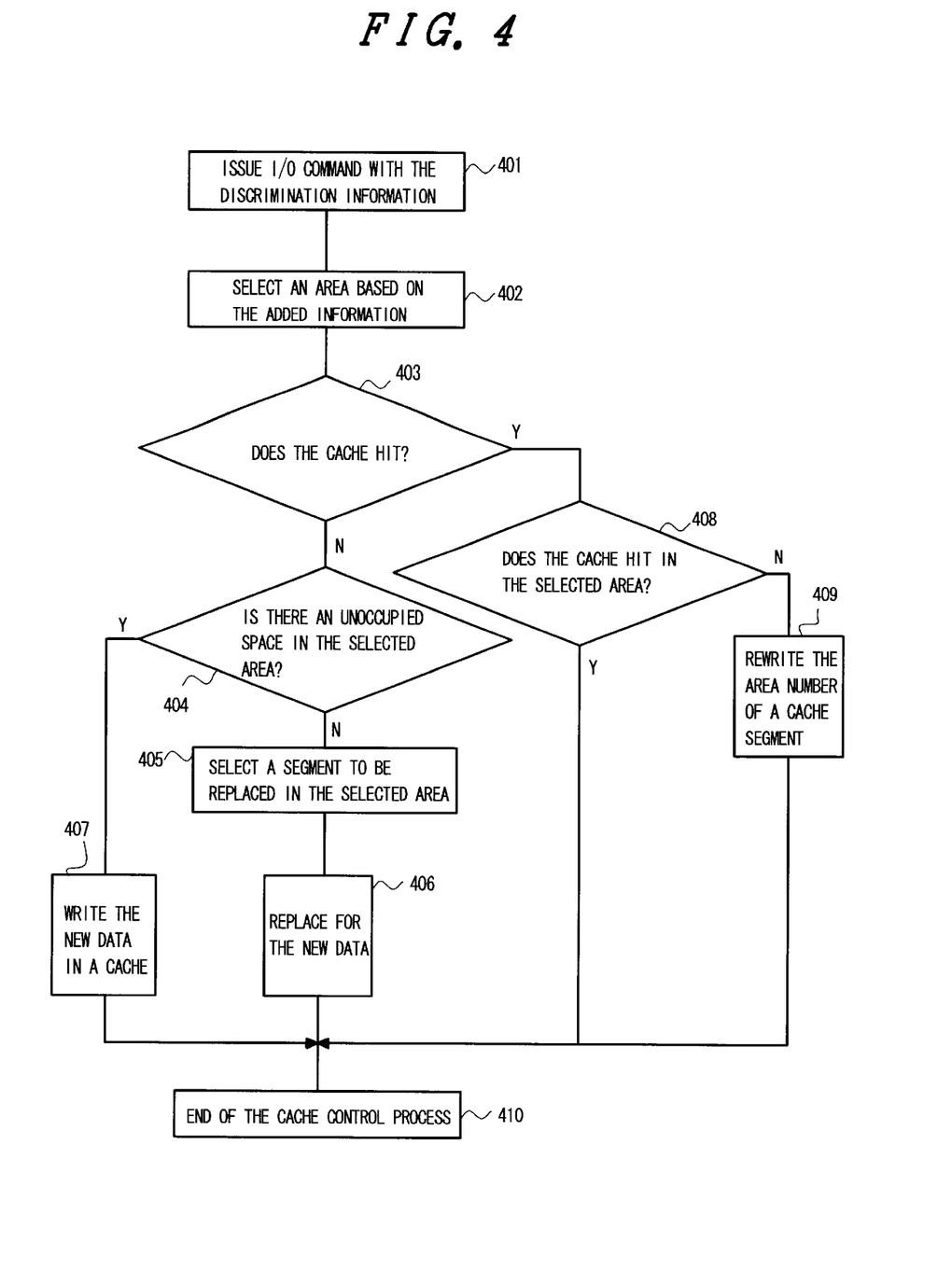
FIG. 4 is a flowchart of the processings in the embodiment of the present invention.

FIG. 4 shows a cache processing procedure executed by the disk controller 102 in this embodiment. The disk controller 102, when receiving an I/O command that includes identification information in correspondence with an I/O type (step 401), selects an area among the divided cache areas according to the identification information (step 402). Then, the disk controller 102 checks the cache memory for presence of the required data (step 403). When the check result is NO (not present), the disk controller 102 further checks if any empty segment exists in the selected cache area (step 404); the segment is used to store the required data. When the check result is NO (not present), the disk controller 102 selects the data to be replaced in the cache memory area with use of the LRU algorithm (step 405), then replaces the data with new data read from the disk drive (step 406). When the check result is YES (present), the disk controller 102 stores the new data in the segment (step 407). At this time, the area number selected in step 402 is recorded in this segment area number field and the segment is validated, thereby the area that includes the new segment is determined. On the other hand, when the cache memory is hit, the disk controller 102 checks if the selected area is hit, that is, if the identification information included in the I/O command matches with the area number recorded in the hit cache segment (step 408). When the check result is YES (match), the cache data is used as it is.

When the check result is NO (not match) in step 408, the disk controller 102 accesses data whose type is different from that specified by the previous I/O command. In this connection, the disk controller 102 updates the segment area number with the newly selected area number. At this time, the disk controller 102 also updates the current used size in the area information table 301 provided in the disk controller. This area number cannot be updated over its upper limit size. When the used size of the updated area already reaches the upper limit, therefore, the above hit segment area number is updated and a segment of data is selected from the cache data having the same area number as the updated area number, then swapped out from the cache memory. The LRU algorithm is used at this time completely in the same way as the selection of the data to be replaced with new data. The above processing is executed in step 409 shown in FIG. 4 for updating an area number. The above described caching in correspondence with the above I/O command thus completes (step 410).

Figure 5:
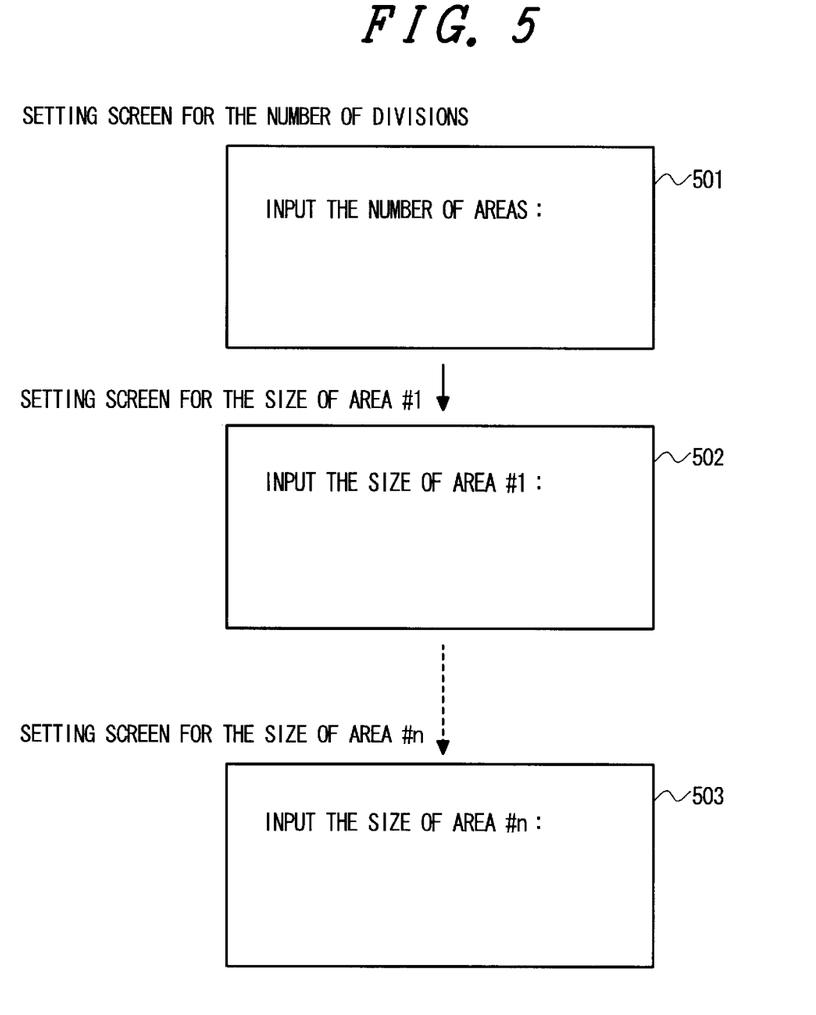
FIG. 5 is screens for specifying a virtual area size.

The system manager assigns the size of each cache memory area. FIG. 5 shows an area setting screen in this embodiment. When the system manager starts up the area setting screen, at first the system manager is requested to set the number of divisions (for the cache memory) on the displayed screen (step 501). When the setting ends, the system manager is requested to set the size of area #1. On the screen, the system manager can also set the size of each cache memory area (steps 502 and 503). The total of the area sizes cannot exceed the capacity of the usable cache memory area, so that the first area size is accepted within a range of 0 to the maximum cache memory size. Similarly, the size of the (n)-th area can be selected within 0 to the remaining cache memory size. When sizes are set for all the areas, the area setting program is terminated. Sizes are not equal among all the areas; an area that is often used can have a larger size. Consequently, the cache memory can be controlled efficiently.

Figure 6:
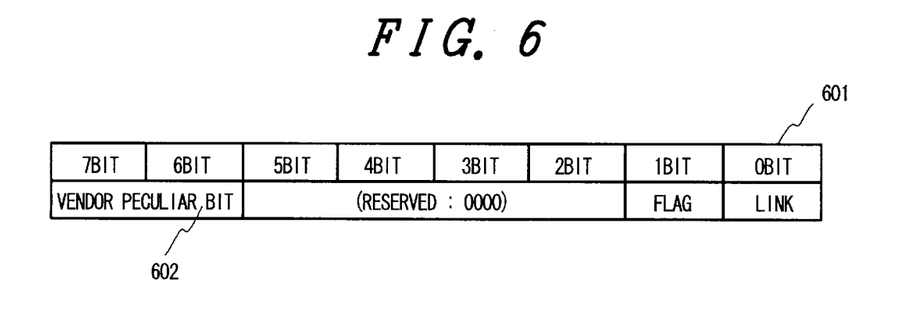
FIG. 6 is a configuration of a format of an I/O command used in the embodiment of the present invention.

In the above embodiment, a control byte of the READ/WRITE command is used to add identification information to each I/O command. As shown in FIG. 6, the reading/writing SCSI command includes a control byte 601 in its last byte. The upper two bits of the control byte 601 are used peculiarly as vender bits 602. In the above embodiment, the data type to be accessed by the I/O command is defined as an I/O type that is divided into four types. These two vender bits are used to store the identification information of each I/O type.

In the above embodiment described above, the identification information added to each I/O command is recorded as an area number in a cache memory segment that is to store new data according to the I/O command. When data in a segment is accessed by an I/O command that includes different identification information, the segment area number is updated to this identification information. The cache memory is divided into virtual areas. In other words, replacement of data in each area in the cache memory is controlled independently so that the upper limit size of the area is not exceeded. This is why the I/O performance of the cache memory is improved. For example, user data accessed by an application program might never be accessed. According to the above replacement management that manages data replacement in each area independently, it is avoided that meta data, which is more often used than user data, is never be replaced with user data. Consequently, it is expected that the cache hitting rate is improved. In addition, the area is distinguished from others by the area number stored together with the data therein, so that there is no need to use a cache memory specially divided beforehand. In addition, a given capacity can be set for each area in the cache memory within an allowable range so as to improve the I/O performance as described above.

Generally, cache memory controlling includes a purge processing, which can discard all the data from the subject cache memory at a time to initialize the cache memory. In this embodiment, the purge processing can be used independently for each virtual area partitioned by an area number in the cache memory. In other words, the cache memory includes an area specification field that specifies an area number in the format of the PURGE command. The disk controller selects all the cache data items having the same recorded area number as that set in the area specification field of the issued PURGE command to discard those data items from the cache memory.

Furthermore, in the above embodiment, the LRU is used to unite all the cache memory control methods for each area, especially to unite all the algorithms for selecting area data to be replaced. Although the LRU algorithm is generally used to control cache memories effectively, the algorithm generates an overhead in access time management. In order to avoid the overhead, the first in, first out (FIFO) method that is easily controllable is employed for some of cache areas so as to reduce the management overhead. For example, it is possible to employ the LRU method for meta data areas that must be controlled more strictly while the FIFO method is employed for user data areas that might be accessed at random.

Next, the second embodiment of the present invention will be described. The second embodiment is characterized by a default area used as a user data area (area number: 00) among four virtual areas set in the cache memory. In other words, the area number of a segment, when data is stored therein, is '00'. The segment is handled as a user data area.

Also in this second embodiment, the area information table is set, for example, as shown in FIG. 3. In this case, however, the user data area among the plurality of virtual areas can be extended so as to include any empty area when the total used size of the area does not reach the upper limit size yet, and accordingly the cache memory has an empty area. This is different from the first embodiment. In other words, the value set as the upper limit size of any user data area in the area information table is not an upper limit size in the strict sense. In addition, an effective bit, not shown, is set in each memory segment. The used size field in FIG. 3 stores data actually, which denotes the number of segments for which '1' is set in the effective bit respectively. Consequently, the used size of the user data area in the area information table is obtained by subtracting the number of segments in which actually no data is stored from the number of segments having the area number '00' respectively. Hereinafter, the controlling procedure for the cache memory will be described with reference to the flowchart shown in FIG. 7.

The step 701 for issuing an I/O command, the step 702 for selecting an area to be accessed according to the identification information added to the I/O command, and the step 703 for checking if the subject access is a cache hit or not are identical to the steps 401, 402, and 403 shown in FIG. 4 that shows the first embodiment. When target data requested by an I/O command is not found in the cache memory, the disk controller determines the method for checking if the area is empty according to whether the selected area is the user data area (area number: 00) or any of other meta data areas (area numbers 01, 10, and 11). When the selected area is determined as a user data area in step 704, the disk controller further checks if any segment in the cache memory is empty. This means that a comparison is made between the total value of the used areas in the area information table shown in FIG. 3 and the total number of segments in the cache memory, that is, the total value set in the upper limit size field (step 707). When there is an empty segment is found, the disk controller stores the new data in the empty segment and updates the effective bit of the segment from 0 to 1. At this time, the area number field (202 shown in FIG. 2) is not updated, since '00' has been set since the segment became empty (step 708). This processing flow causes the user data used size to exceed the upper limit size in the area information table sometimes. When no empty segment is found in step 707, the disk controller selects data to be replaced from the user data area in step 709, then replaces the data with new data in step 711.

Figure 7:
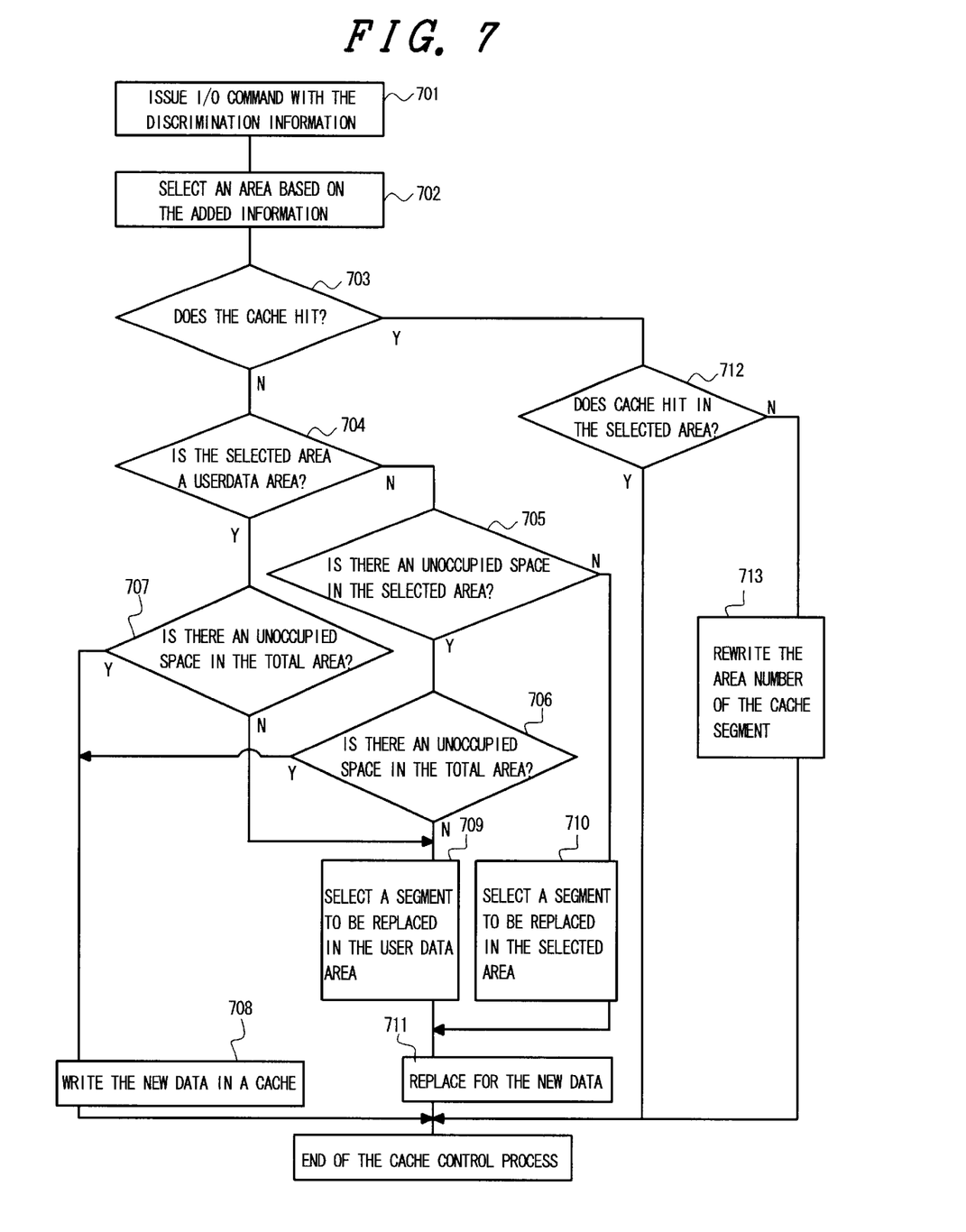
FIG. 7 is a flowchart of the processings in another embodiment of the present invention.

On the other hand, when the selected area is determined as any of the meta data areas in step 704, the disk controller compares the upper size with the used size of the area to check the segments for presence of any empty segment (step 705). When any empty segment is found, the controller compares the total of the values set in the used size field in the area information table with the total number of segments in the cache memory to determine if there is any empty segment in the cache memory (step 706). When any empty segment is found, the controller stores the new data in the empty segment. Then, the controller records the selected area number in the segment area number field and writes '1' in the effective bit (step 708). A case in which no empty segment exists in the cache memory in step 706 means a case in which user data occupies even an area that should originally be used for meta data. In step 709, therefore, the controller selects the data from one of the segments having the user data area number '00' as the data to be replaced, then replaces the data with new data in step 711. At this time, the controller updates the data having the area number of the segment whose data is to be replaced from '00' to the selected area number corresponding to the new data. With those processings in steps 705, 709, and 711, even when an actual user data area is expanded over the upper limit size temporarily, the data in the expanded part is replaced with meta data sequentially.

When no empty segment is found in the selected area in step 705, the controller selects a segment to be replaced from the selected area in step 710 and goes to step 711 to replace the data in the selected segment with new data. These processings are similar to those in steps 405 and 406 in FIG. 4. In addition, steps 712 and 713 in this flowchart are similar to steps 408 and 409 in FIG. 4. The processing in step 712 is to determine if the selected area is hit or not at the time of a cache hit and the processing in step 713, when a non-selected area is hit, is to access the cache memory data and update the segment area number. When the selected area is determined to be a user data area in step 713, the data is not swapped out from the cache memory even when the area size exceeds the upper limit value.

In this embodiment, a cache processing referred to as flashing can be performed. Flashing means saving cache data stored in some areas into a default area collectively. Concretely, the disk controller, upon receiving a FLASH command, updates all the area numbers 01, 10, and 11 of cache data to '00'. At this time, the controller can execute a flash processing independently for each area. This is because the FLASH command is provided with an area specification field that specifies an area to be flashed such way in its format. The disk controller thus updates the area number of the cache data having the same area number as that set in the area specification field of the FLASH command to '00'. When '00' is already set in the area specification field of the issued FLASH command, the controller updates all the area numbers 01, 10, and 11 in the cache memory to '00'.

In the embodiment of the disk controller that executes the cache controlling flow shown in FIG. 7, only user data area among the plurality of set cache areas can be expanded temporarily with use of the empty segments that should originally be used as other areas. Consequently, the cache memory in this second embodiment can be used more effectively than the first embodiment. User data that uses any extended area, when new data is received from another area, is replaced with the new data sequentially. In other words, each area size is usually controlled to the upper limit size set in the area information table. This means that data to be accessed frequently is prevented from being replaced with data not to be accessed so frequently, thereby the cache hit percentage increases.

According to the present invention, therefore, the performance of the data I/O to/from disks can be improved, since the type of the data accessed by each I/O command is recorded as an area number of the subject cache memory in correspondence with the cache data and cache data replacement is controlled for each virtual area identified by such an area number and each divided area is controlled in accordance with the level of the data access frequency. The cache hit percentage thus increases. The user is not required of any processing to obtain the effect. In addition, the user can set a given capacity for each of those virtual cache areas, so that the capacity can be set easily in accordance with the data state.

The foregoing invention has been described in terms of preferred embodiments. However, those skilled, in the art will recognize that many variations of such embodiments exist. Such variations are intended to be within the scope of the present invention and the appended claims.

What is claimed is:

1. A disk system, comprising:
   a CPU for issuing an I/O command;
   a disk drive;
   a disk cache memory for storing disk data in each of its segments selectively; and
   a disk controller for controlling said disk drive and said disk cache memory;
   wherein each segment of said cache memory includes a field for storing an area number; and
   wherein said disk controller includes means for recording a value corresponding to a type of said I/O command in said area number field when storing disk data in said cache memory according to said I/O command issued from said CPU, updating said area number to a value corresponding to a type of said I/O command each time it accesses data in said cache memory according to said issued I/O command, and controlling swapping out of data from each area of said cache memory according to a predetermined upper limit size set for said area partitioned by said area number in said cache memory.

2. A method for controlling a cache memory that stores data selectively in each segment of a disk, said method comprising the steps of:
   (a) setting an upper limit size for each of a plurality of virtual areas in said cache memory;
   (b) issuing an I/O command that includes identification information for identifying a type of data to be accessed;
   (c) selecting a virtual area to be accessed from among said plurality of virtual areas according to said identification information included in said issued I/O command;
   (d) determining whether to perform a cache replace processing so as to store new data when said data to be accessed by said issued I/O command is not found in said cache memory; and
   (e) selecting cache data to be replaced with new data, said cache data having the same virtual area number as that of said virtual area when said cache replace processing is to be performed, the replacing said cache data with said new data, storing said new data when said cache replace processing is not to be performed, and recording the number of said selected virtual area corresponding to said new data in a field of said cache memory for storing the area number in any of said above cases.

3. The method according to claim 2;
   wherein whether to perform said cache replace processing is determined according to whether or not the size of the stored cache data has reached a predetermined upper limit size set for said virtual area, said cache memory having the same virtual area number as that of said selected virtual area.

4. The method according to claim 2;
   wherein said method further includes a step of accessing said data and determining whether or not the number of a virtual area corresponding to said data matches with the number of said selected virtual area when said data to be accessed by said issued I/O command is found in said cache memory, as well as updating said number of said virtual area corresponding to said data to the number of said selected virtual area when said determination result is NO.

5. The method according to claim 4;
   wherein said method further includes a step of swapping out one of cache memory data items having said same virtual area number from said cache memory upon updating of said virtual area number when the total size of cache data items having the same virtual area number as that of said selected virtual area has reached a predetermined upper limit size set for said virtual area.

6. The method according to claim 2;
wherein an algorithm for selecting one of said plurality of virtual areas subjected to said cache replace processing differs from others for selecting any of the rest virtual areas subjected to cache replace processings.

7. The method according to claim 2;
wherein one of said plurality of virtual areas is a default area and the number of said default area is recorded in correspondence with each segment of said cache memory before data is stored therein.

8. The method according to claim 7;
wherein, when said selected area is said default area, whether to perform said cache replace processing is determined by whether or not any empty area is found in said cache memory; and
wherein, when said selected virtual area is not said default area, said determination is done according to whether or not the size of the stored cache data having the virtual area number has reached an upper limit size set for said virtual area.

9. The method according to claim 7;
wherein said method further includes a step of determining whether or not the number of a virtual area corresponding to the data to be accessed by said issued I/O command matches with that of said selected virtual area when said data is found in said cache memory and accessing said data to update the number of said virtual area corresponding to said data to the number of said selected virtual area when said determination result is NO.

10. The method according to claim 9;
wherein said method further includes a step of swapping out one of cache data items having said same area number upon updating said virtual area number when the total size of cache data itmes having the same virtual area number as that of said selected virtual area has already reached a predetermined upper limit size.

11. The method according to claim 7;
wherein said method further includes a step of updating numbers of all the specified virtual areas except for said default area to the number of said default area, thereby saving all of said data in said default area.

12. The method according to claim 2;
wherein said method further includes a step of purging all the cache data items having a specified virtual area number from said cache memory.

13. The method according to claim 2;
wherein said identification information is used at least to identify whether the data to be accessed is user data or meta data and accordingly, one of said plurality of virtual areas is used to store user data.

14. The method according to claim 9;
wherein whether to perform said cache replace processing is determined by the determination result of whether or not said cache memory includes any empty area when said selected virtual area is used to store user data, and by the determination result of whether or not the size of the stored cache memory data having said virtual area number has reached an upper limit size set for said virtual area when said selected virtual area is not used to store user data.

* * * * *